(12) United States Patent
Thorimbert

(10) Patent No.: US 9,987,993 B2
(45) Date of Patent: Jun. 5, 2018

(54) HOLDER DEVICE, KIT AND METHOD FOR SUPPORTING ONE OR MORE LONG-BARRELED GUNS IN A VEHICLE

(71) Applicant: John Brent Thorimbert, Medicine Hat (CA)

(72) Inventor: John Brent Thorimbert, Medicine Hat (CA)

( * ) Notice: Subject to any disclaimer, the term of this patent is extended or adjusted under 35 U.S.C. 154(b) by 116 days.

(21) Appl. No.: 15/185,297

(22) Filed: Jun. 17, 2016

(65) Prior Publication Data

US 2017/0361776 A1   Dec. 21, 2017

(51) Int. Cl.
*B60R 7/14* (2006.01)
*F41A 23/18* (2006.01)

(52) U.S. Cl.
CPC ............... *B60R 7/14* (2013.01); *F41A 23/18* (2013.01); *Y10S 224/913* (2013.01)

(58) Field of Classification Search
CPC ......... B60R 7/14; Y10S 224/913; F41A 23/18
USPC ........................................ 224/544, 546, 913
See application file for complete search history.

(56) References Cited

U.S. PATENT DOCUMENTS

| | | | | |
|---|---|---|---|---|
| 3,477,587 A * | 11/1969 | Hart | ........................... | B60R 7/14 211/64 |
| 3,706,403 A * | 12/1972 | Sikes | ........................ | B60R 7/14 224/275 |
| 4,995,537 A * | 2/1991 | Thedieck | ................... | B60R 7/14 211/64 |
| 5,443,191 A * | 8/1995 | Jorgenson | .................. | B60R 7/14 211/64 |
| 5,979,099 A * | 11/1999 | Kervin | ..................... | F41A 23/02 42/94 |
| 6,019,325 A * | 2/2000 | Dotson | .................... | B63B 49/00 248/121 |
| 6,293,447 B1 * | 9/2001 | Jorgensen | .................. | B60R 7/14 211/64 |
| D476,290 S * | 6/2003 | Gates | ...................... | A01K 97/10 D12/408 |
| 6,695,183 B2 * | 2/2004 | Hancock | .................. | B60R 11/00 211/64 |
| D516,402 S * | 3/2006 | Gates | ....................... | B60R 11/00 D8/71 |
| 7,099,467 B1 * | 8/2006 | Rohrbach | ............... | G09B 15/00 379/441 |
| 7,100,808 B2 * | 9/2006 | Hancock | ................... | F16L 3/10 224/547 |
| 7,140,586 B2 * | 11/2006 | Seil | ......................... | B60R 11/00 224/542 |

(Continued)

*Primary Examiner* — Justin Larson

(57) ABSTRACT

A holder for supporting a long-barreled gun in a vehicle comprises a base and a holder, whereby the base may be removably coupled to the cup holder of a vehicle and the holder is adapted to support the stock of a long-barreled gun. The holder may be adjustable so as to snugly receive various sizes of gun stocks and may be covered in a cushioning material. The height of the holder relative to the base may be adjustable. The base may include one or more cavities adapted for holding bullets. The holder may include a selectively releasable retainer for retaining the stock of the gun in the holder. A method and kit for mechanically coupling two or more gun holding devices so as to prevent movement of one gun holding device relative to the other gun holding devices is also provided.

17 Claims, 14 Drawing Sheets

(56) References Cited

U.S. PATENT DOCUMENTS

| | | | | |
|---|---|---|---|---|
| 7,668,309 B2* | 2/2010 | Wilcox | ............... | B60R 11/0241 |
| | | | | 379/454 |
| 7,681,768 B2* | 3/2010 | Gates | ...................... | B60R 11/00 |
| | | | | 224/401 |
| D626,494 S * | 11/2010 | Gates | ........................... | D12/412 |
| 8,061,670 B1* | 11/2011 | White | ...................... | B60N 3/10 |
| | | | | 248/309.1 |
| 2004/0031835 A1* | 2/2004 | McLeod | ................ | B60N 3/107 |
| | | | | 224/544 |
| 2012/0305613 A1* | 12/2012 | Allen | .................. | A47B 81/005 |
| | | | | 224/545 |
| 2015/0129440 A1* | 5/2015 | Abascal | ................. | F41C 33/06 |
| | | | | 206/317 |
| 2016/0031379 A1* | 2/2016 | Duncan | .................... | B60R 7/14 |
| | | | | 224/567 |

* cited by examiner

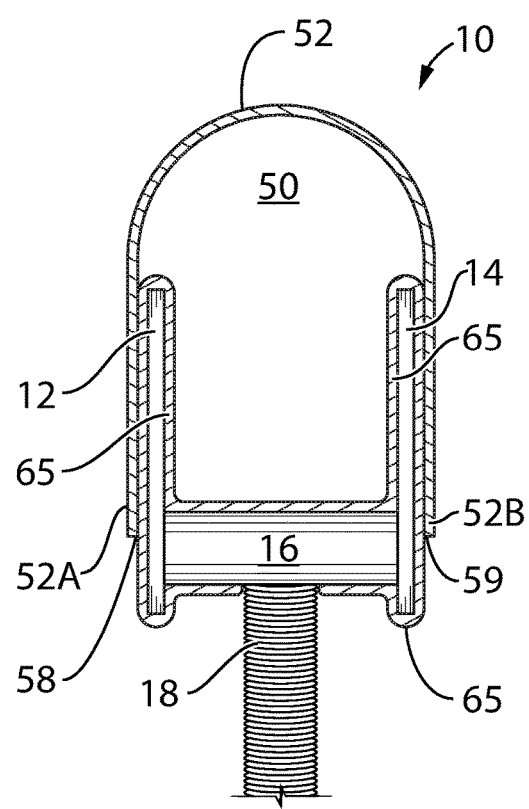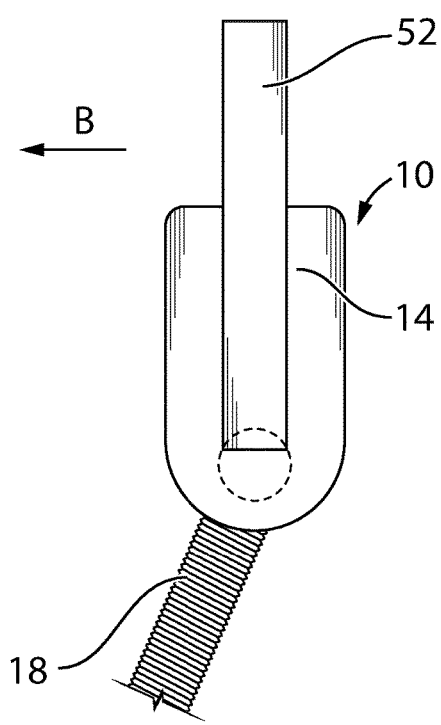
FIG. 1C  FIG. 1D

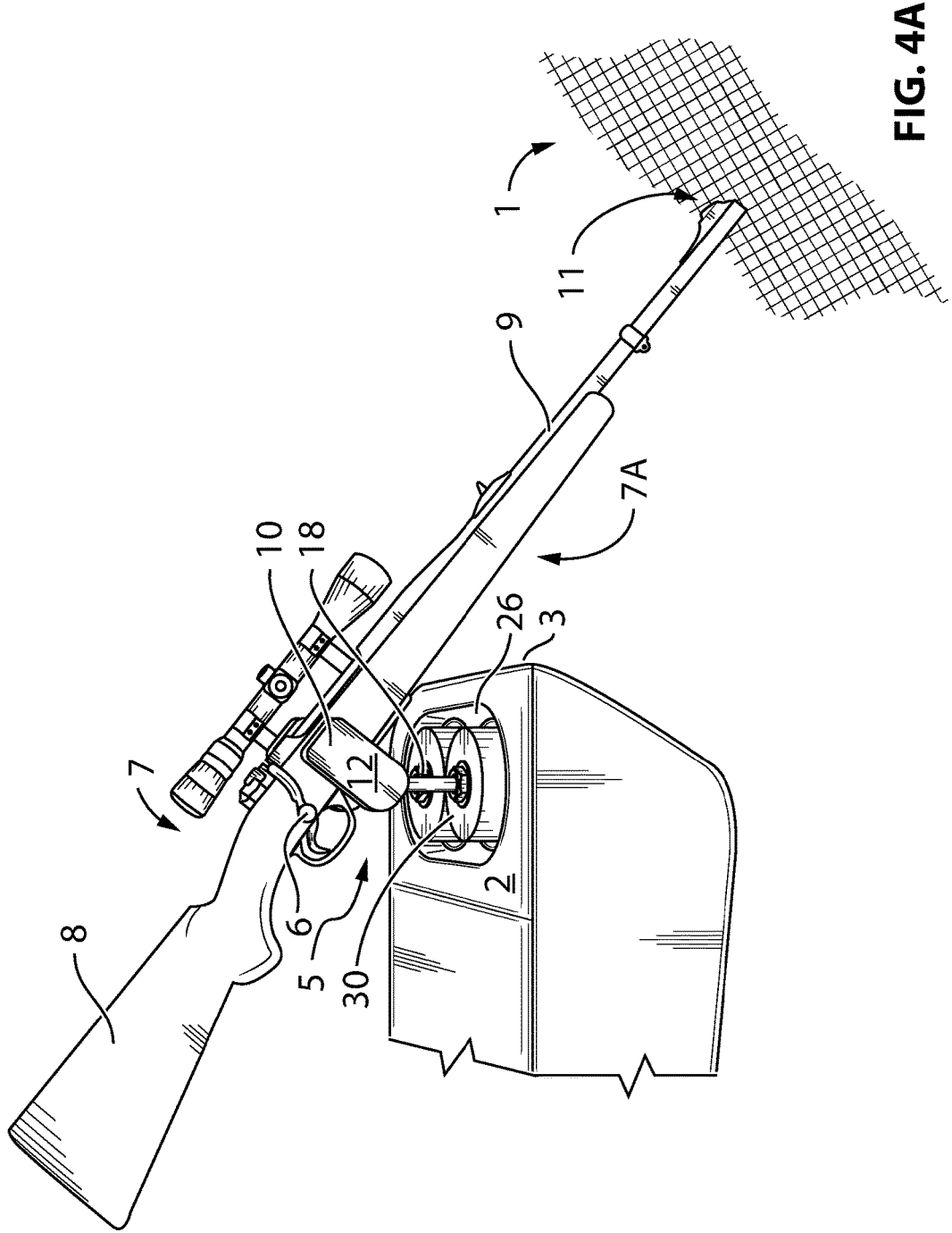

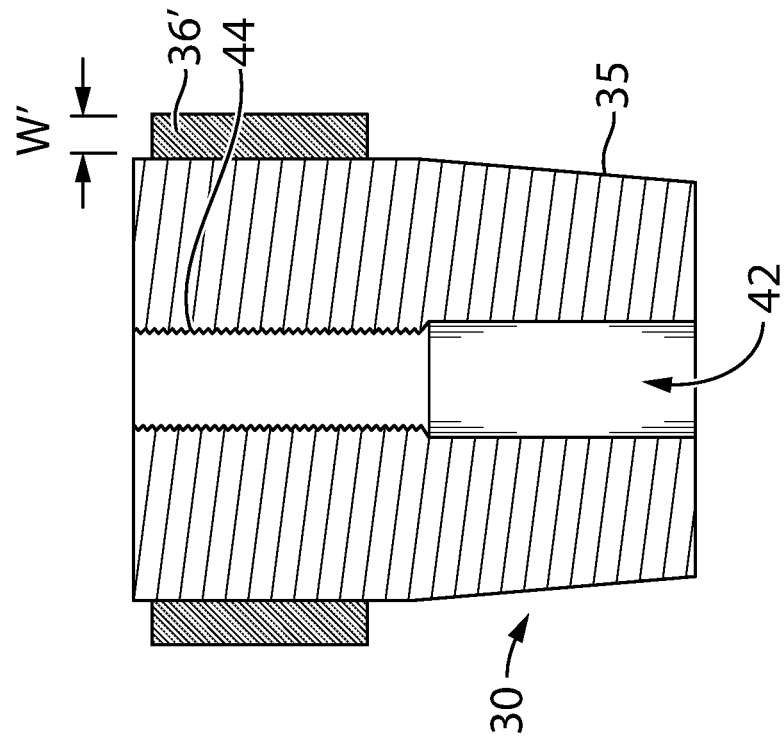
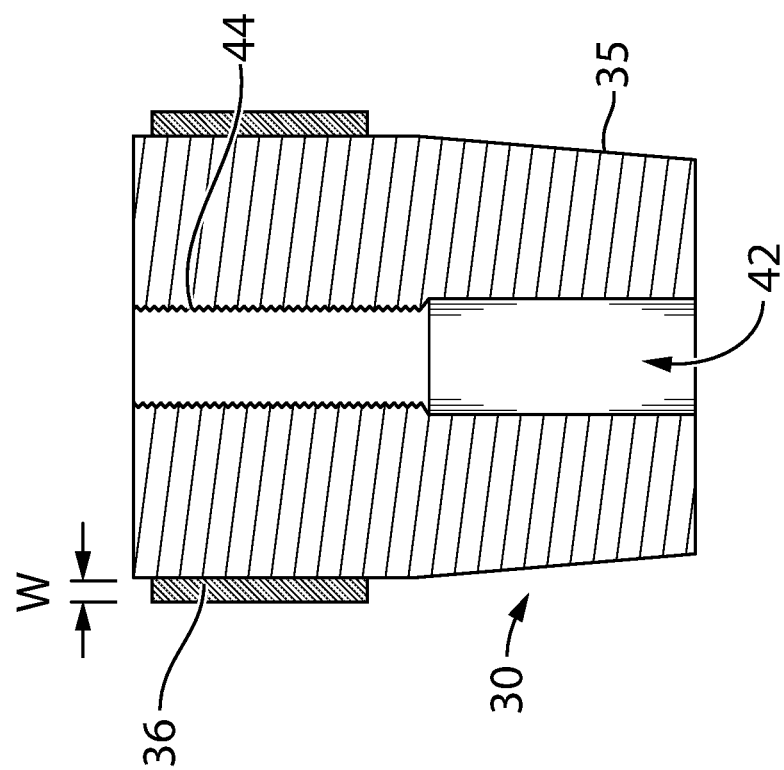

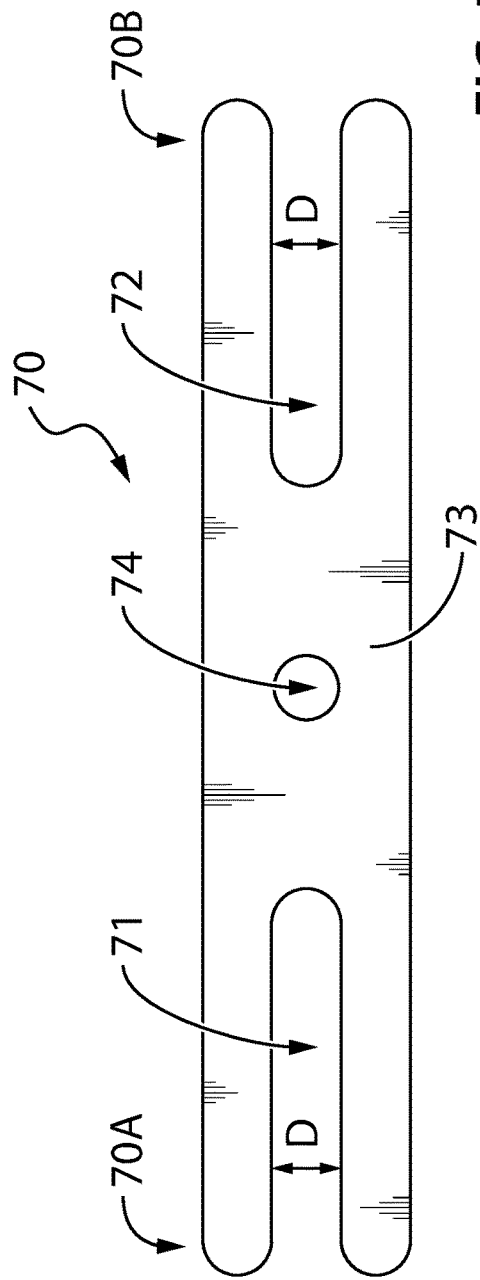
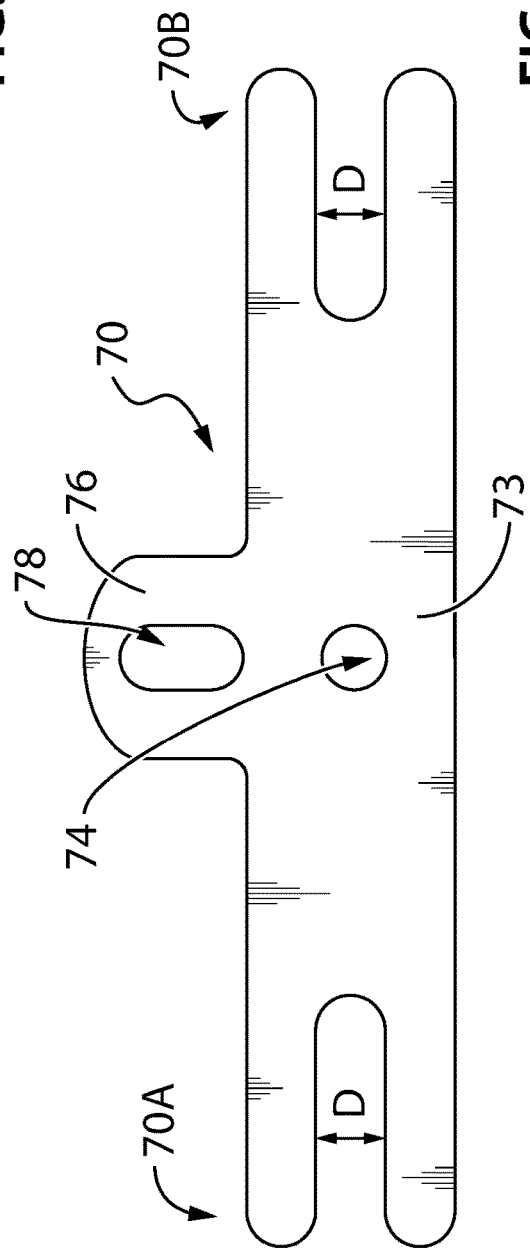

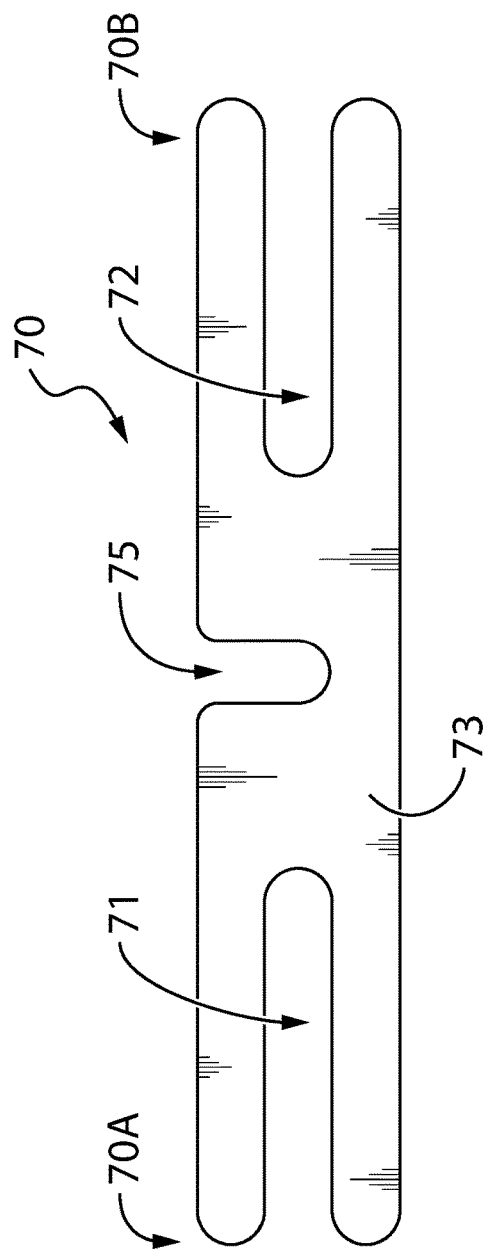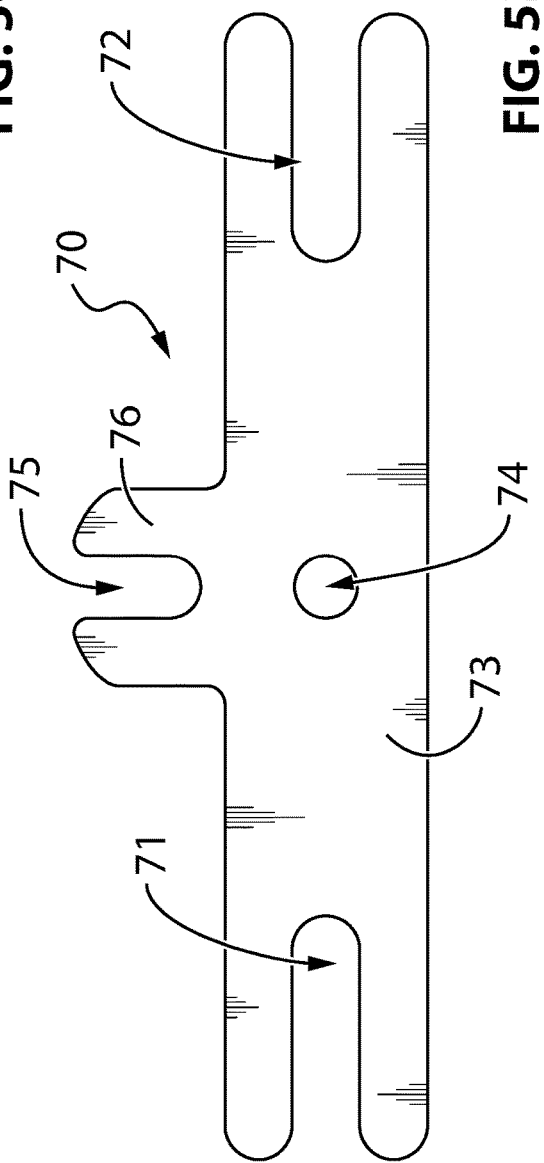
FIG. 5C
FIG. 5D

HOLDER DEVICE, KIT AND METHOD FOR SUPPORTING ONE OR MORE LONG-BARRELED GUNS IN A VEHICLE

FIELD OF DISCLOSURE

The present disclosure relates to a holder for mounting in a vehicle for supporting a long-barreled gun or other elongated weapon, and a kit and method for supporting two or more long-barreled guns, or other elongated weapons, in a vehicle. More particularly, the present disclosure relates to holders adapted to hold long-barreled guns or other elongated weapons within the cab of a vehicle, whereby the long-barreled guns or other elongated weapons are readily accessible to a person travelling in the vehicle.

BACKGROUND

The modern day pursuit of hunting game often involves motorized vehicles. Commonly, hunters use motorized vehicles, such as pickup trucks or sports utility vehicles, to move from location to location during a hunting trip. Modern day hunters may usefully transport themselves and their hunting rifle from location to location, scouting areas that may be conveniently situated for hunting game and tracking potential targets. Once an ideal location for hunting is found or a potential target is spotted, the hunter may need to quickly disembark from the motorized vehicle with the hunting rifle and take up an ideal stance for shooting at the spotted target, so as to successfully shoot the target before it moves to another location.

Thus, a hunter may need to quickly get in and out of a vehicle with the hunting rifle multiple times during a hunting trip to scout out ideal locations for shooting potential targets. As a hunter travels in a motorized vehicle to a new location, it is very inconvenient to have to store a hunting rifle in its case for transport, especially when short and frequent trips are made by vehicle to various locations. As such, the hunter may transport a rifle in a vehicle by resting the stock of the hunting rifle between the driver's leg and either the centre console of the motorized vehicle or the door on the left-hand side of the driver, with the barrel of the rifle pointing downwards and touching the floor of the vehicle. This method of transporting a hunting rifle, even for a short distance, is generally not recommended, as the barrel of the rifle may become fouled with debris or mud, or readily slide out of position and interfere with the operation of the brake or gas pedal, possibly resulting in an accidental crash.

Another option may be to rest the stock of the hunting rifle against the passenger seat of the vehicle; however, with the barrel of the rifle resting in the footwell of the passenger side of the vehicle, the hunting rifle is at significant risk of damage caused by being jostled around during transport due to the constant motion of the vehicle, especially while travelling over uneven terrain, thereby potentially causing damage to the rifle by contact with either the floor of the vehicle or the surrounding center console and door panels, etc. Additionally, there is often excessive mud, rocks, dirt, water, snow and other debris in the footwells of the vehicle, which may soil, scratch or otherwise damage the hunting rifle. Thus, it is desirable to have a gun holder for a motorized vehicle that will stably support a hunting rifle in a position within the cab of the vehicle so as to make the hunting rifle readily accessible during transport.

In the prior art of which the applicant is aware, it is disclosed to provide gun racks or mounts within motorized vehicles that are made to support a long-barrelled gun so as to be readily accessed by a person riding in the motorized vehicle. However, several of such prior art racks or mounts for vehicles require significant time and effort to install; for example, U.S. Pat. No. 2,692,069 to Winters discloses a gun rack that bolts to the seat frame of a vehicle, while each of U.S. Pat. No. 4,364,499 to McCue and U.S. Pat. No. 6,986,446 to Murray et al disclose gun racks or mounts which are bolted to the floor of a vehicle.

Other prior art of which the applicant is aware, such as U.S. Pat. No. 6,293,447 to Jorgensen, U.S. Pat. No. 5,833,102 to Jacobsen and U.S. Pat. No. 5,799,850 to Ryder, disclose gun carriers, support systems or gun racks which require multiple straps so as to secure the gun carriers or support systems to various portions of the vehicle, such as the center console or the seat bench, or otherwise utilize telescoping arms to resiliently support a gun rack underneath the dash of a vehicle, as is the case in the Ryder patent.

Each of the installation methods described above require significant time and effort, and similarly, significant time and effort is required to remove such devices or systems from a vehicle, in order to, for example, readily use these devices or systems in other vehicles. Furthermore, each of the devices or systems described above may be particularly suited to a specific design of the interior of a given vehicle, such as a specific seat design or center console design, which may render these installation methods unsuitable for variations in seats, dashes or center consoles in various different makes and models of vehicles. Thus, there is a need for a gun holder adapted to support a hunting rifle or other long-barreled gun or elongated weapon within a vehicle during transport which may be easily installed in, and removed from, suitable vehicles without requiring much time, effort, or tools to install or remove the gun holder. The nature of such suitable vehicles will become apparent to the reader, having regard to the description which follows below.

In other prior art, of which the applicant is aware, such as U.S. Pat. No. 6,793,108 issued to Williams, Jr. and U.S. Pat. No. 6,793,109 issued to Gates et al, there is disclosed holding devices adapted to be bolted to an elongate support structure, such as a railing on a rack extension plate of an all-terrain vehicle (ATV). To distort the teaching of Williams, Jr. and Gates et al, each of these holding devices have a "base" or lower end that could conceivably slide into a cup holder in a front console of another vehicle, such as a truck or SUV, and thereby possibly assist in supporting a long-barreled gun or other elongate weapon within the cab of the vehicle. However, each of the holders disclosed in the Williams and Gates patents have "bases", or lower ends, that would not be stable when slid into the cup holders of a vehicle, and would therefore experience a large range of motion while mounted in a cup holder, especially while the vehicle is travelling over rough terrain. In particular, the lower end of the Williams holder comprises a pair of parallel flanges with rounded edges, which would cause the holder to roll around and tilt within a cup holder, and would likely tumble out of the cup holder with any movement of the vehicle. The Gates holder includes an oval-shaped base which would also likely tilt within a cup holder.

Furthermore, the applicant is also aware of U.S. patent application Ser. No. 14/445,763 by applicant Duncan, which discloses a holster for receiving and holding a hand gun that mounts into a cup holder of a vehicle. The Duncan holster is adapted for holding a hand gun or similarly-sized weapon, and is not suitable for holding a long-barreled gun or similarly-sized, elongated weapon.

Therefore, there is a need for a holding device for a long-barreled gun or other elongate weapon that may be easily mounted in a cup holder of a vehicle and which would stably support the long-barreled gun or other elongate weapon during transport in the vehicle, even when travelling over somewhat rough terrain.

SUMMARY

In an embodiment of the present disclosure, a gun holding device for supporting a long-barreled gun, or other elongated weapon (herein interchangeably referred to as a long-barreled gun, or a gun) in a vehicle is provided, comprising a base adapted for snugly and releasably mounting in a cup holder of a vehicle and a holder adapted for supporting a stock of the gun, whereby the barrel muzzle of the gun may be positioned adjacent to, or preferably, in contact with, a floor of the vehicle when the stock of the gun is supported in the holder of the gun holding device. Alternatively, the butt end of the stock of the gun may be positioned adjacent to or in contact with the floor of the vehicle when the barrel and/or fore-end of the stock is supported in the holder of the gun holding device.

In a further embodiment, a height of the holder is adjustable relative to the base by a height adjuster. In a further embodiment, the height adjuster may include a threaded rod and a locking mechanism, wherein an upper end of said rod is coupled to said holder and a lower end of said rod is coupled to the base.

In a further embodiment, the holder of the gun holding device further comprises a foundation, a first arm and a second arm. In yet a further embodiment, the lateral distance between the first and second arms is selectively adjustable.

In a further embodiment, the holder further comprises a foundation, wherein at least a portion of a surface of each of the foundation and the first and second arms are covered in a cushioning material whereby the surface of the stock is in contact with the cushioning material.

In a further embodiment, the foundation comprises a planar surface, the planar surface being positioned at an angle of 130° relative to a centroidal axis extending in a vertical direction through the center of the base and coaxial with the rod.

In a further embodiment, a circumference of the base may be selectively expanded by securing a resilient cushion around the radially outward surface of the base.

In a further embodiment, the base comprises an upper surface and a lower surface, wherein the lower surface is adjacent the bottom surface of the cup holder when the gun holding device is mounted in said cup holder and the upper surface is proximate the holder, wherein the upper surface comprises at least one cavity adapted so as to slidably receive a bullet, whereby the bullet may stored in the at least one cavity. In a further embodiment, the holder further comprises a selectively attachable retainer that couples to each of the first and second arms so as to retain the stock of the gun in the holder.

In a further embodiment, a kit for coupling at least two gun holding devices comprises: at least one crossbar, the crossbar comprising at least a first and second coupling point, and at least two of the gun holding devices described above.

In a further embodiment of the present disclosure, a method for coupling at least two gun holding devices using the kit comprises:
a) providing the kit,
b) coupling a first gun holding device to the first attachment point of the crossbar,
c) coupling a second gun holding device to the second attachment point of the crossbar,
whereby a position of the first gun holding device remains fixed relative to a position of the second gun holding device.

In a further embodiment, the method further comprises providing a crossbar comprising at least three attachment points and coupling a third gun holding device to the third attachment point of the crossbar, whereby a position of the third gun holding device remains fixed relative to the positions of said first and second gun holding devices.

In a further embodiment, the method further comprises providing a second crossbar comprising a body and at least a first and second attachment, coupling a first gun holding device to the first attachment point of the first crossbar, coupling a second gun holding device to the first attachment point of the second crossbar and coupling a third gun holding device to the second attachment points of each of the first and second crossbars.

In another embodiment, a holding device for removably supporting a rifle in the cab of a vehicle wherein the rifle has first and second opposite ends, and the cab of the vehicle has at least one centrally disposed cup holder in a console in the cab, is disclosed, the holding device comprising: a bifurcated support having an opening into the bifurcated support at an upper end thereof, a base sized to fit snugly into the cup holder in the cab, a height adjuster mounted to, so as to extend between, a lower end of the bifurcated support and an upper end of the base, wherein one of the first and second ends of the rifle is removably supportable in the opening of the bifurcated support when the base is mounted in the cup holder so as to dispose the opposite end of the rifle resting against an interior, lower surface within the cab of the vehicle.

BRIEF DESCRIPTION OF THE DRAWINGS:

FIG. 1C is a front profile, partially cut away view of an embodiment of the holder of the present disclosure;

FIG. 1D is a side profile view of the embodiment of the holder shown in FIG. 1C;

FIG. 4A is a side profile view of an embodiment, showing the stock of a long barreled gun received in the holding portion of a gun holder, for example, that of FIG. 2;

FIG. 4B is a front profile, cut away view of an embodiment, illustrating the base of FIGS. 1A, 1B and 2 with a removable fit sleeve;

FIG. 4C is a front profile, cut away view of an embodiment, illustrating the base of FIG. 4B with a second embodiment of the removable fit sleeve;

FIG. 5A is a top plan view of an embodiment of a crossbar of the present disclosure;

FIG. 5B is a top plan view of a further embodiment of a crossbar of the present disclosure;

FIG. 5C is a top plan view of a further embodiment of a crossbar of the present disclosure;

FIG. 5D is a top plan view of a further embodiment of a crossbar of the present disclosure;

DETAILED DESCRIPTION

Figures 1A, 1B:
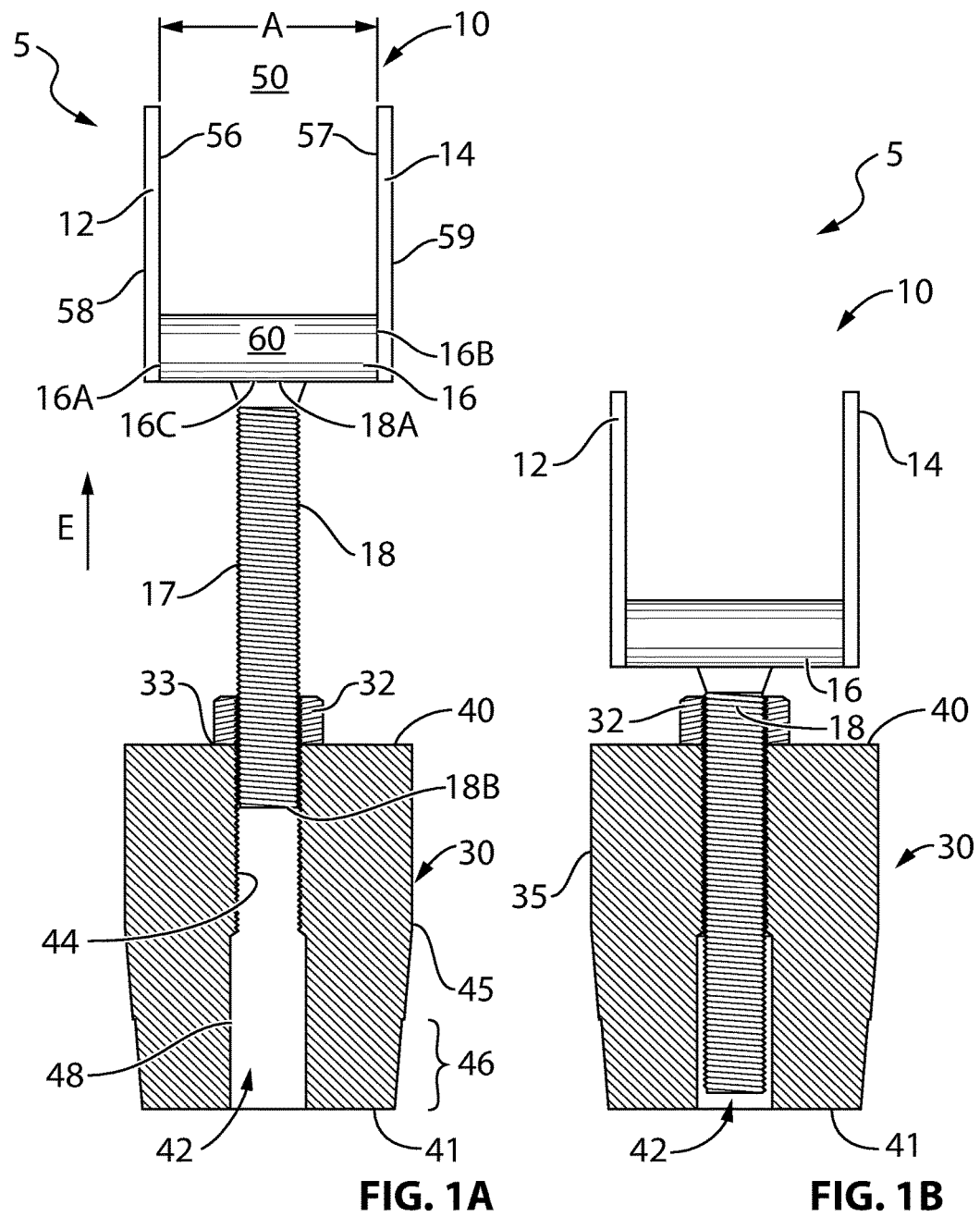
FIG. 1A is a front profile, partially cut away view of an embodiment of the present disclosure, with the adjustable rod fully extended.
FIG. 1B is the front profile of FIG. 1A, with the adjustable rod fully retracted.

Advantages and objects of this disclosure will become apparent and will be understood by means of the detailed description below, which may be had by reference to the embodiment thereof illustrated in the appended drawings, which form a part of this specification and wherein like reference numerals denote corresponding parts in each view. It is to be noted, however, that the drawings illustrate only certain embodiments of this disclosure and therefore, are not to be considered limiting of the disclosure's scope as it may admit of other, equally effective embodiments.

In an embodiment of the present disclosure, a gun holding device 5 comprises a holder 10, a base 30, and a rod 18 connecting the holder 10 to the base 30. The holder or support 10 comprises a first arm 12, a second arm 14 and a foundation 16, wherein the first arm 12 is attached to a first end 16A of foundation 16, and the second arm 14 is attached to a second portion 16B of foundation 16. An upper end 18A of rod 18 is attached to a centre portion 16C of the foundation 16. A person skilled in the art will understand that the arms 12, 14 may be attached to the foundation 16 and the foundation 16 may be attached to the rod 18 by any suitable means, including but not limited to welding, or that they may be formed as a unitary piece, in whole or in part, during manufacture. For example, the arms 12, 14, foundation 16, rod 18 and base 30 may be formed as a single piece of strong plastic, such as for example by injection molding or any other suitable means, so as to result in, for example, a bifurcated support 10.

The base 30 of gun holding device 5 comprises an upper surface 40 and a lower surface 41. The upper surface 40 of base 30 interfaces with the rod 18 and jam nut 32, while the lower surface 41 of base 30 is adapted to interface with a cup holder 26, for example that provided in the centre console 2 of a vehicle. In an embodiment, the base 30 is substantially cylindrical in shape, and preferably sized so as to slidably, for example, snugly, mount into the cavity of a cup holder 26 in a given vehicle, whereby at least a portion of the radially outward exterior surface 35 of the base 30 is in contact with the interior surface of the cup holder 26. In a preferred embodiment, the upper surface 40 of the base 30 is substantially in the shape of a circle, and similarly, the lower surface 41 of the base 30 is also substantially in the shape of a circle. In an embodiment of the present disclosure, the base 30 is frusto-conical so that the circumference of the upper surface 40 is slightly larger than the circumference of the lower surface 41 of the base 30, and thus the body of the base 30 may gradually narrow from the upper surface 40 towards the lower surface 41. The profile of the body of the base 30 may begin to narrow at a point of inflection 45 located between the upper surface 40 and the lower surface 41, for example approximately mid-way the height of base 30.

In another embodiment, rather than the body of the base 30 gradually narrowing between the upper surface 40 and the lower surface 41, there may be a lower portion 46 adjacent the lower surface 41 of the base 30 which is instantaneously narrowed, relative to the portion of the base 30 that is immediately above, and immediately adjacent, the lower portion 46. As will be appreciated by a person skilled in the art, the profile of the base 30, such as seen in FIG. 1A, may be adapted in numerous ways so as to provide for a snug fit between the base 30 and the cup holder 26, in order to accommodate a cup holder 26 which may be of various different sizes and shapes. Any such variations to the profile of the base 30 adapted so as to slidably mate with any cup holder 26 are within the scope of the present disclosure. Preferably, base 30 is shaped so as to fit snugly in a cup holder 26, but this is not intended to be limiting as a non-snug mating will also work, if for example base 30 is stabilized within a cup holder by other means described by way of example, below.

The base 30 has a bore 42, for example a vertical bore journaled through the centre of base 30. Rod 18 mates in or is mounted in bore 42. In an embodiment, where for example rod 18 is cylindrical, bore 42 may also be cylindrical and may extend from the upper surface 40 to the lower surface 41 of the base 30. Alternatively, bore 42 may extend only part-way through base 30 towards the lower surface 41 of the base 30. The interior surface of the bore 42 may include a threaded surface 44, which is adapted to mate with a series of complementary threads on the surface 17 of the rod 18. The interior surface of the bore 42 may also include an unthreaded portion 48. In an alternative embodiment, the entire interior surface of the bore 42 may consist of a threaded surface 44.

Preferably, the rod 18 is removably coupled to the base 30 by means which allow for a height adjustment of rod 18 and holder 10 relative to the base 30. In the threaded embodiment, the height of the holder 10 relative to the base 30 may be adjusted by rotating the rod 18 within the bore 42, thereby causing a lower end 18B of rod 18 to translate along bore 42, either upwardly or downwardly depending on the direction of rotation of rod 18 about its longitudinal axis. Once the height of the holder 10 relative to the base 30 has been adjusted as appropriate to the interior vehicle dimensions and location of cup holder 26 as described below. A jam nut 32 may be rotated so as to be adjacent the upper surface 40 of the base 30. Jam nut 32 is torqued onto base 30 to releasably lock the position of rod 18

As will be understood by a review of FIGS. 1A and 1B, the height of the holder 10 relative to the base 30 may be incrementally adjusted through a range of heights from an extended position, as illustrated in FIG. 1A, to a retracted position, as illustrated in FIG. 1B. Thus in the illustrated embodiment, the height of the holder 10 relative to the base 30 is variable between the extended position shown in FIG. 1A and the retracted position shown in FIG. 1B. This is not intended to be limiting as other height adjustment mechanisms will work, some of which will only provide for discrete height positions of holder 10 above base 30. As may be seen in FIG. 4A, adjusting the height of the holder 10 relative to the base 30 enables a user of the gun holder device 5 to adjust the exposed length of the rod 18 so as to provide the required clearance to prevent contact or rubbing between the lower surface of gun 7, for example the lower surface of fore-end 7A, and the edge 3 of, for example, a centre console 2 having a cup holder 26. Although not intended to be limiting, gun 7 may be a hunting rifle or other long gun. The height adjustment for the gun holder device 5 enables a user to adapt the gun holding device 5 for ease of installation in vehicles of many makes and models, such as for example pickup trucks, which may have a wide variety of sizes and configurations for the centre console 2 of those vehicles.

In an embodiment, the base 30 is manufactured of a suitable material, such as for example, not intended to be limiting, PVC, injection molded plastic, rubber, steel, aluminum. It will be understood by a person skilled in the art that any material may be used in the manufacture of the base 30, which material provides sufficient rigidity to the base 30 so as to stably support holder 10 when base 30 is installed in a cup holder 26.

In a further embodiment, a fit sleeve 36, manufactured for example of a foam rubber, sponge rubber, plastic or other resilient material. Sleeve 36 may be provided for snug mounting of base 30 in cup holder 26. Sleeve 36 may also for example be an elasticized band manufactured of terry cloth or similarly stretchable, voluminous material, which may be mounted on the exterior surface 35 of the base 30 so as to increase the circumference of base 30. The sleeve material may include an elasticized or otherwise stretchable material so as to provide ease of instalment around, and removal from, the exterior surface 35 of the base 30. The fit sleeve 36 may merely be a length of material that is wrapped around the exterior surface 35 of base 30. As may be seen in FIGS. 4B and 4C, the sleeves 36 may have different thicknesses so as to provide for different widths (for example, W, W') that will increase the total circumference of the base 30 so that base 30 and sleeve 36 are a snug fit in cup holders 26 of various sizes and shapes. In a further alternative embodiment, any resilient material known to a person skilled in the art suitable for the manufacture of fit sleeve 36 may be either permanently or removably affixed to the exterior surface 35 of the base 30, so as to provide for a better and more stable fit of the base 30 within cup holders 26 of various shapes and sizes.

The holder 10 of the gun holding device 5 is adapted so as to support, preferably, the stock 8 of a hunting rifle or other long-barrel gun 7. In a preferred embodiment, the lateral distance A between the first arm 12 and the second arm 14 of the holder 10 is sized so as to receive a variety of widths for gun stocks 8 for a variety of long-barreled guns 7, so that the sides of the gun stock 8 may rest against either, or both, of the first arm 12 and the second arm 14, while the bottom of the stock 8 of the gun 7 rests against the foundation 16 of the holder 10. Alternatively, the holder 10 of gun holding device 5 may support the barrel 9 and/or fore-end of the stock of gun 7.

Figure 2:
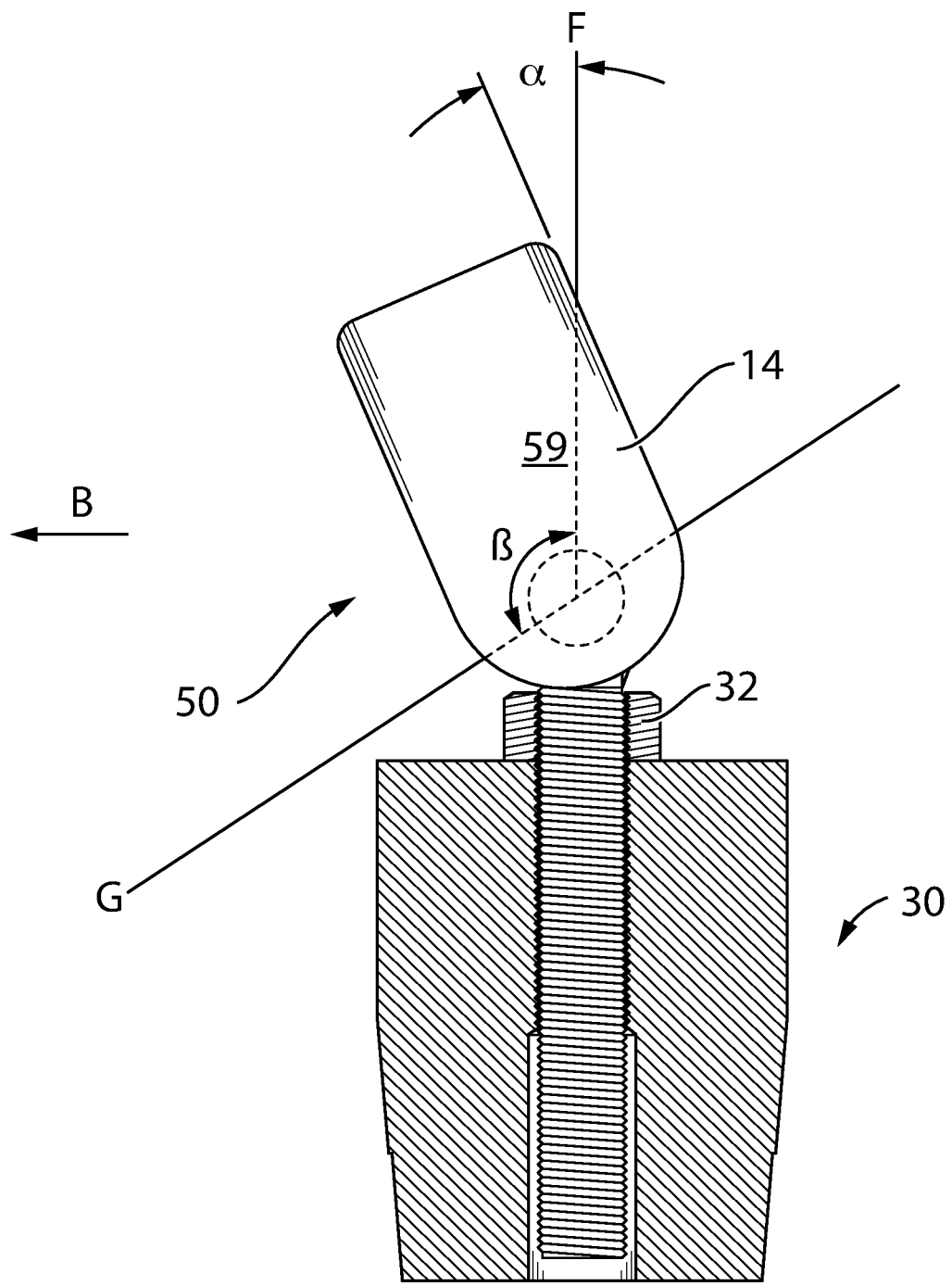
FIG. 2 is a side profile view of an embodiment of the present disclosure, with the adjustable rod fully retracted as in FIG. 1B.

As seen in FIG. 2, the first and second arms 12, 14 of the holder 10 may be canted at an angle α relative to a centroidal axis F, which axis F is substantially collinear with the bore 42 and rod 18. Preferably, angle α may range in value from approximately 30° to 45°. Furthermore, the inner surface 60 of the foundation 16 may be a planar surface, with a lateral axis G substantially coplanar with the plane of the surface 60 of foundation 16, whereby the planar surface 60 is canted at an angle β as measured between the centroidal axis F and the lateral axis G. Preferably, the angle β may range in value from approximately 120° to 135°. This angling of the holder 10 relative to the centroidal axis F, so as to cant the surface 60 of the foundation 16, on which surface the stock 8 of the gun 7 will rest, provides greater surface area contact between the stock 8 and the holder 10, thus providing greater stability to the gun 7 when it is supported in the gun holding device 5. Furthermore, the angling of the arms 12, 14 relative to the centroidal axis F provides better clearance for the bolt handle 6 to be positioned outside the holder 10, as best seen in FIG. 4A.

Thus, for use in the forward cab compartment in a vehicle, and so that the end or muzzle 11 of the gun barrel 9 may rest for example on the floor or other supporting surface 1 of the cab, holder 10 is canted forward or at least the planar, upper surface 60 of foundation 16 is inclined, so as to be flush along the stock 8 when laid thereon.

The holder 10 may be manufactured of strong material, such as mild steel, stainless steel, aluminum, strong plastics or another suitable metal or other materials known to a person skilled in the art. In an embodiment, as seen in FIG. 1C, either a portion of, or the entire surface of, the holder 10 is covered in a soft resilient material 65, such as for example a nylon dip, foam rubber, sponge rubber or a soft carpet or fabric material, such as for example, marine carpet. In an embodiment, the material 65 used to cover the surfaces of the holding portion 10 will provide a soft surface 56, 57 and/or 60 for supporting the stock 8 of a gun 7 resting in the holder 10, so as to prevent scratching or denting the surface of the stock 8, which may be manufactured of wood or other relatively softer materials (relative to the hard materials the holder 10 is manufactured of), that may otherwise be easily damaged by rubbing against a metal (or other hard) surface of the gun holder 10.

In an embodiment, the material 65 used to cover the surfaces of the holding portion 10 may also be resilient to damage caused by the gun stock 8 rubbing against, or moving around within, the holding portion 10 of the gun holding device 5. The nylon dip, foam or sponge rubber, and marine carpeting materials mentioned are examples of material suitable for covering the holding portion 10 as they each provide a soft surface for interfacing the surfaces 56, 57 and/or 60 with the stock 8 of the gun 7, while at the same time the material 65 is strong enough to resist tearing that may be caused by the stock 8 of the gun 7 rubbing against the surfaces 56, 57 and/or 60 of the first end second arms 12, 14 and foundation 16, respectively. It is understood by a person skilled in the art that other materials 65 may be suitable for covering the surfaces the holder 10 of the gun holding device 5.

In an alternative embodiment, advantageously the distance A between arms 12, 14 may be adjustable so as to accommodate, or snugly hold, various widths of the stocks 8 of different types of long-barreled guns 7.

Figure 8:
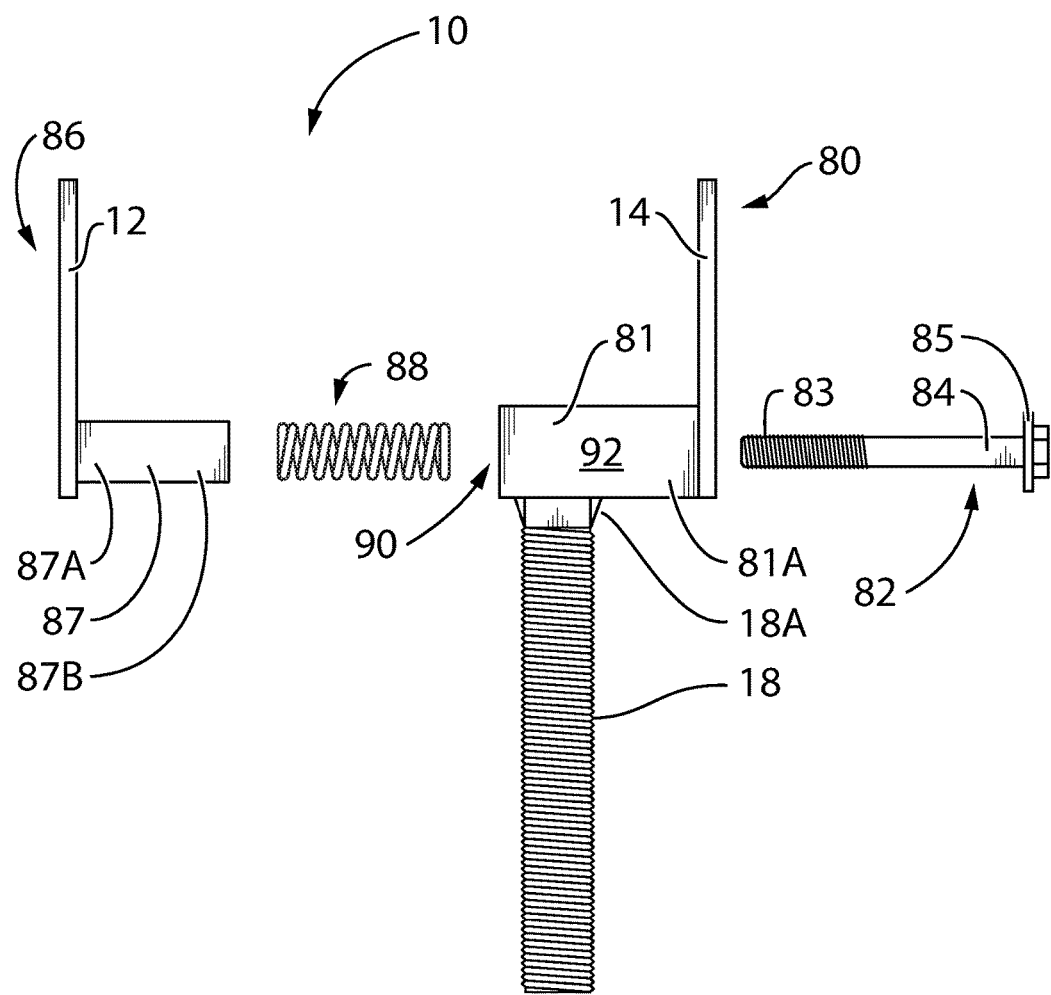
FIG. 8 is an exploded front profile view of an embodiment of the present disclosure, showing an adjustable holder.

As illustrated in FIG. 8, an adjustable, alternative embodiment of holder 10 comprises a sliding portion 86 and a fixed portion 80. Sliding portion 86 comprises a pin 87 and a first arm 12 attached to a first end 87A of the pin 87. The first arm 12 may be substantially perpendicular to the pin 87. The fixed portion 80 comprises a sleeve 81, a second arm 14 attached to a first end 81A of sleeve 81 whereby the second arm 14 is substantially perpendicular to the sleeve 81. Sleeve 81 is also coupled to the first end 18A of rod 18. The sleeve 81 further comprises a channel 90 extending through the centre of sleeve 81, whereby the channel 90 is adapted so as to snugly receive the pin 87.

The pin 87 is adapted so as to slidably mate with the sleeve 81 of the fixed portion 80, so as to ensure that the pin 87 is unable to rotate within the channel 90 when fitted into the sleeve 81. For example, this may be accomplished by utilizing a pin 87 that is in the shape of a hexagon prism or a square prism whereby a lateral cross section of the pin 87 is in the shape of a hexagon or square respectively, or some other shape that would not be able to rotate when fitted into a snugly fitting sleeve 81 of the same shape as the pin 87, or alternatively, any pairing of shapes for the pin 87 and channel 90 such that the pin 87 would be unable to rotate within the channel 90. In a further alternative, the pin 87 may be cylindrical and the channel 90 may also be cylindrical, so long as there is a key and key seat provided on the pin 87 and the channel 90 of the sleeve 81, respectively. In the embodiment shown in FIG. 8, not intended to be limiting, the pin 87 is substantially in the shape of a hexagon and the corresponding channel 90 is also substantially in the shape of a hexagon and sized so as to snugly receive the pin 87.

Figure 9:
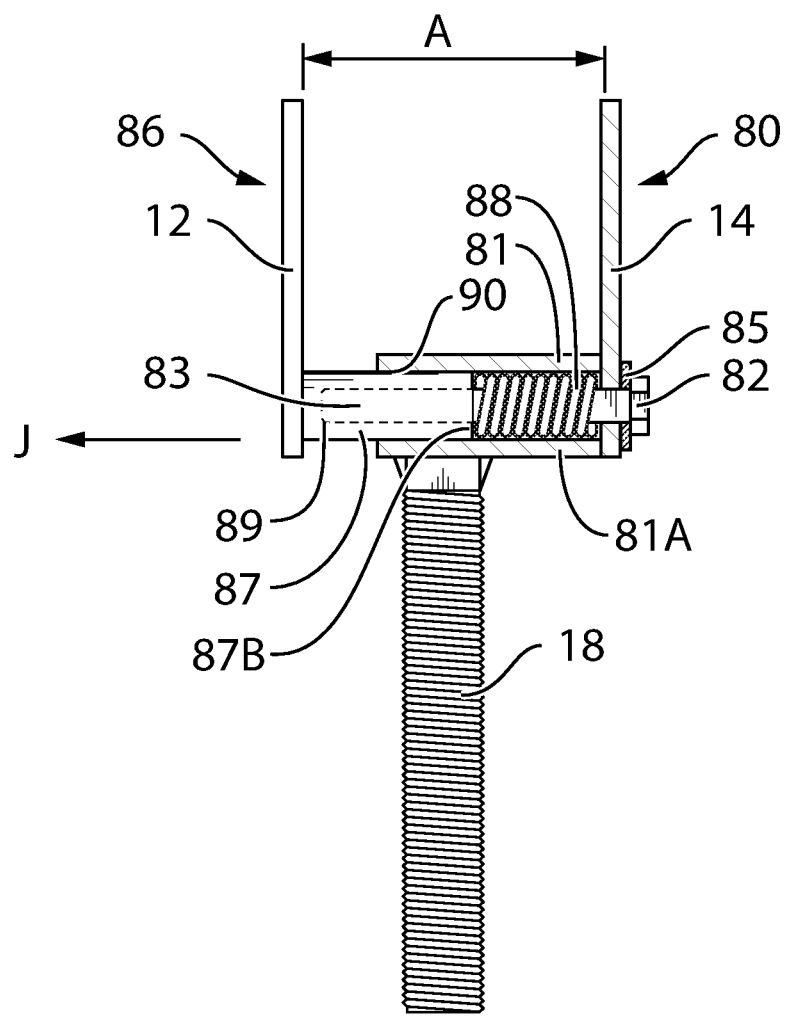
FIG. 9 is a front profile, partially cut away view of the adjustable holder illustrated in FIG. 8.

An adjustable holding portion 10, in accordance with an embodiment of the present disclosure, further includes a bolt 82 comprising a threaded length 83 and a shank length 84. In addition, there is a spring 88 disposed in between, and resiliently biased against, a second end 87B of the pin 87 and adjacent to the first end 81A of the sleeve 81. As may be seen in FIG. 9, in operation the pin 87 comprises a threaded bore 89 running through a longitudinal axis of the pin 87. Assembled together, the holding portion 10 comprises a spring 88 inserted in the channel 90, and then the pin 87 is inserted into the sleeve 81. The threaded length 83 of bolt 82 is then inserted into the first end 81A of the sleeve 81, travels through the centre of the spring 88, and is then journaled into the threaded bore 89 of the pin 87. For example, not intended to be limiting, twisting the bolt 82 in a clockwise direction may journal the threaded length 83 of the bolt 82 into the threaded bore 89, thereby urging the second end 87B of the pin 87 towards the first end 81A of the sleeve 81. Similarly, rotating the bolt 82 in a counterclockwise direction will journal the threaded portion 83 of the bolt 82 outwardly of the threaded bore 89 of the pin 87, resulting in the second end 87B of the pin 87 moving away from the first end 81A of the sleeve 81 in direction J. The spring 88 is biased between the first end 81A of the sleeve 81 and the second end 87B of the pin 87 so as to urge the second end 87B away from first end 81A. Thus, the distance A between the first arm 12 and the second arm 14 may be shortened by twisting the bolt 82 in a clockwise direction, or lengthened by twisting the bolt 82 in a counterclockwise direction. In an embodiment, there may be a knob, such as a plastic press-on knob or similar component known to a person skilled in the art, attached to the head 79 of bolt 82 so as to make it easier for a user of the gun holding device to grasp and rotate the bolt 82 (not shown).

Figure 10:
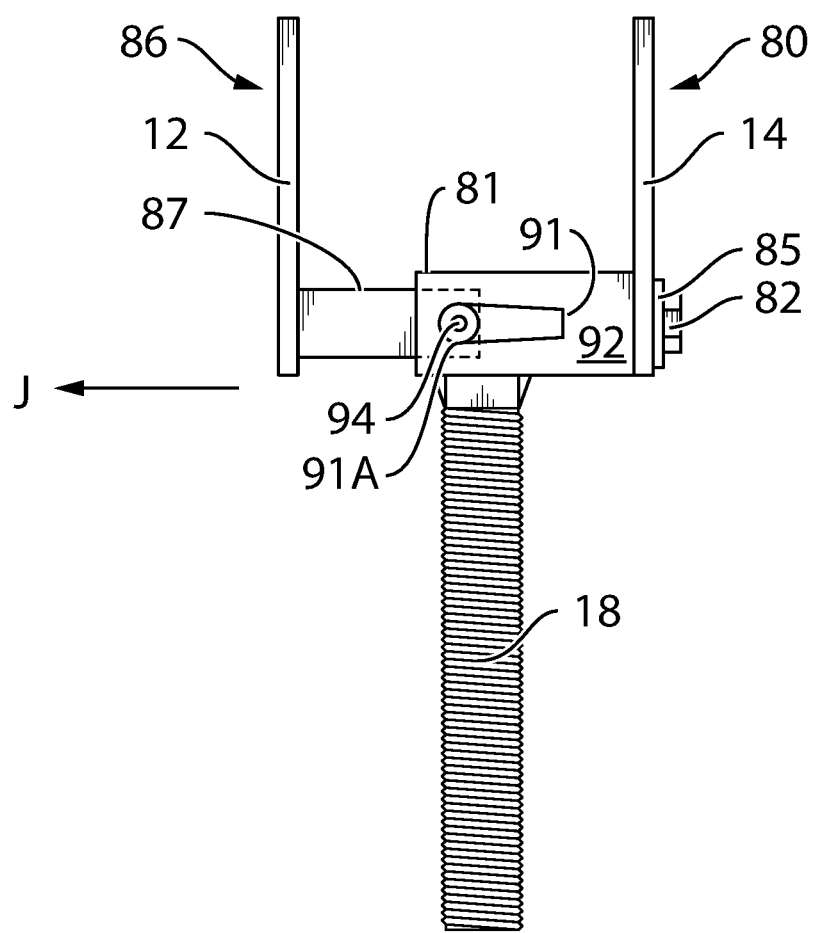
FIG. 10 is a front profile view of the stopper mechanism of the adjustable holder illustrated in FIG. 8.

In a further embodiment, so to prevent separation of the sliding portion 86 from the fixed portion 80 of the adjustable holder 10, a stopper mechanism may be provided. For example, as illustrated in FIG. 10, an obround opening 91 is located on a side wall 92 of sleeve 81. Furthermore, a protrusion 94 is provided on the surface of the pin 87 and adapted so as to extend from the surface of the pin 87 and through the obround opening 91 on the sleeve 81 when the pin 87 is coupled to the sleeve 81. Thus, as the pin 87 slides in a direction J, the protrusion 94 will encounter a shoulder 91A of the obround opening 91, thus preventing any further movement of the sliding portion 86 in direction J.

In an embodiment of the present disclosure, as for example illustrated in FIGS. 1C and 1D, one or more strips of additional material, such as for example, not intended to be limiting, strips of one wrap hook and loop connectors (such as for example, Velcro™), consisting of hooks on one side of the strip and complementary loops on the opposite side of the strip, may be added to any of, or a combination of, the interior surfaces 56, 57 of the arms 12, 14 and/or the surface 60 of the foundation 16, so as to adjust the padding of each of those interior surfaces 56, 57 and/or 60 and make them more suited to supporting a smaller-sized stock 8 of a long-barreled gun 7. For example, one or more strips of dual-sided Velcro™ may be added to the surface 60 of foundation 16 and/or to the inner surfaces 56, 57 of the first arm 12 and the second arm 14, so as to effectively decrease the distance A between the inner surfaces 56, 57 of arms 12, 14, thereby providing better support for the smaller stock 8 of a long-barreled gun 7; or alternatively, for supporting the barrel 9 and/or fore-end 7A of a gun 7.

In an embodiment, this additional padding may be easily added by mating the hook side of a dual sided Velcro™ strip to the loops created on the surface marine carpeting covering the inner surfaces 56, 57 of the first and second arms 12, 14 and the surface 60 of foundation 16 of the holder 10, thereby securing the Velcro™ strips and/or the padding to the marine carpet surface of the inner surfaces of the holder 10. Similarly, the additional Velcro™ strips and/or other padding material secured to the strips, by attachment means such as glue, stitching or other suitable attachment means, may be easily removed from the holder 10 by grasping a portion of the Velcro™ strip and/or padding and applying an upward force to the Velcro™ strip and/or padding until the hooks on the Velcro™ strap release the loops on the surface of the marine carpeting (not shown).

In a preferred embodiment, a selectively removable retainer 52, such as for example a dual sided Velcro™ strip, may be utilized so as to cover the opening 50 of holder 10 when the stock 8 of the gun is resting in holder 10, so as to better secure the stock 8 of the gun 7 resting in holder 10 when the vehicle suddenly decelerates causing any unsecured objects within the vehicle to continue moving in a forward direction due to the laws of inertia, such as what happens when a driver of a vehicle suddenly applies the brakes. In an embodiment of the present disclosure, where inner surfaces 56, 57, 60 and outer surfaces 58, 59 of the holder 10 are covered in a material 65 providing loops on the surface of that material, such as for example marine carpeting, one or more retainers 52 may be secured to the outer surfaces 58, 59 of the first and second arms 12, 14. For example, as may be seen in FIGS. 1C and 1D, a retainer 52 may be secured at a first end 52A of the retainer adjacent to the outer surface 58 of first arm 12, and secured at a second end 52B of retainer 52 to the outer surface 59 of second arm 14. In this manner, the retainer 52 may assist in retaining stock 8 of the gun 7 resting within the opening 50 of the holder 10 when the operator of a motor vehicle suddenly applies the brakes, potentially causing the stock 8 of gun 7 to accelerate out of the holding portion 10 in direction B (see FIG. 2).

Figure 3A:
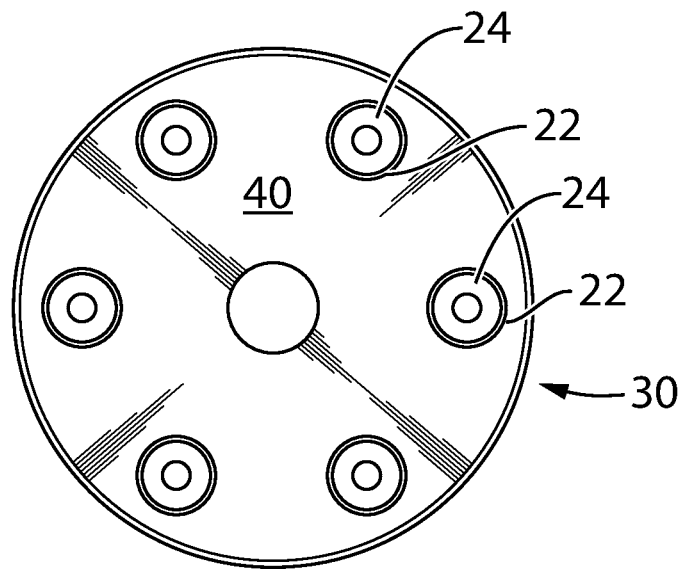
FIG. 3A is a top plan view of the base of an embodiment, showing cavities adapted for receiving bullets.
Figure 3B:
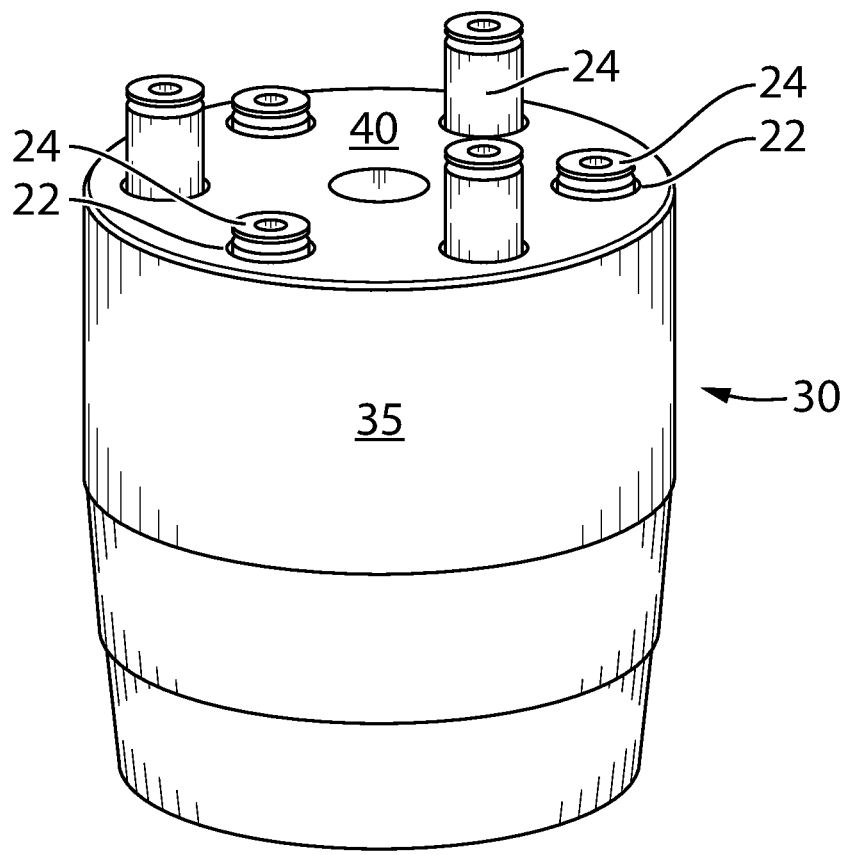
FIG. 3B is a front perspective view of the base of FIG. 3A.

In a further embodiment, as illustrated in FIGS. 3A and 3B, the surface of the upper surface 40 of the base 30 may be provided with one or more cavities 22 adapted for receiving a portion of a bullet 24. The one or more cavities 22 may hold one or more bullets 24 for loading into the long-barreled gun 7. In addition, the one or more cavities 22 may be used for holding one or more bullets 24, which provides for a convenient and secure place to hold the bullets 24 when travelling in a motorized vehicle with a gun 7. For example, in some jurisdictions it may be required that the long-barreled gun 7 be unloaded when travelling in a vehicle. Thus, the one or more cavities 22 provided in the upper surface 40 of base 30 may be used to hold the one or more bullets 24 in a convenient location when the vehicle is in motion.

In a further embodiment, a crossbar 70 is provided so as to mechanically link two or more gun holding devices 5. As may be seen in FIG. 5A, a crossbar 70 is comprised of a body 73, an annular opening 74 located in substantially the centre of the body 73, a first elongated C-shaped opening 71 located on a first end 70A of crossbar 70, and a second elongated C-shaped opening 72 located adjacent a second end 70B of crossbar 70. Other embodiments of the crossbar 70 are illustrated in FIGS. 5B, 5C and 5D; for example, the crossbar 70 may further comprise a tab 76 extending laterally from substantially the center of the body 73, wherein the tab 76 comprises an obround opening 78, as seen in FIG. 5B. The crossbar 70 may further comprise a third elongated opening 75 extending laterally outwardly of the body 73 and positioned substantially in the center of the body 73, as shown in FIG. 5C, or positioned on a tab 76, as shown in FIG. 5D. It is understood by a person skilled in the art that any number of configurations of a crossbar 70 comprising a combination of elongated, annular and/or obround openings are possible, and the scope of this disclosure is not intended to be limited to the embodiments of the crossbar 70 described herein.

Figure 6:
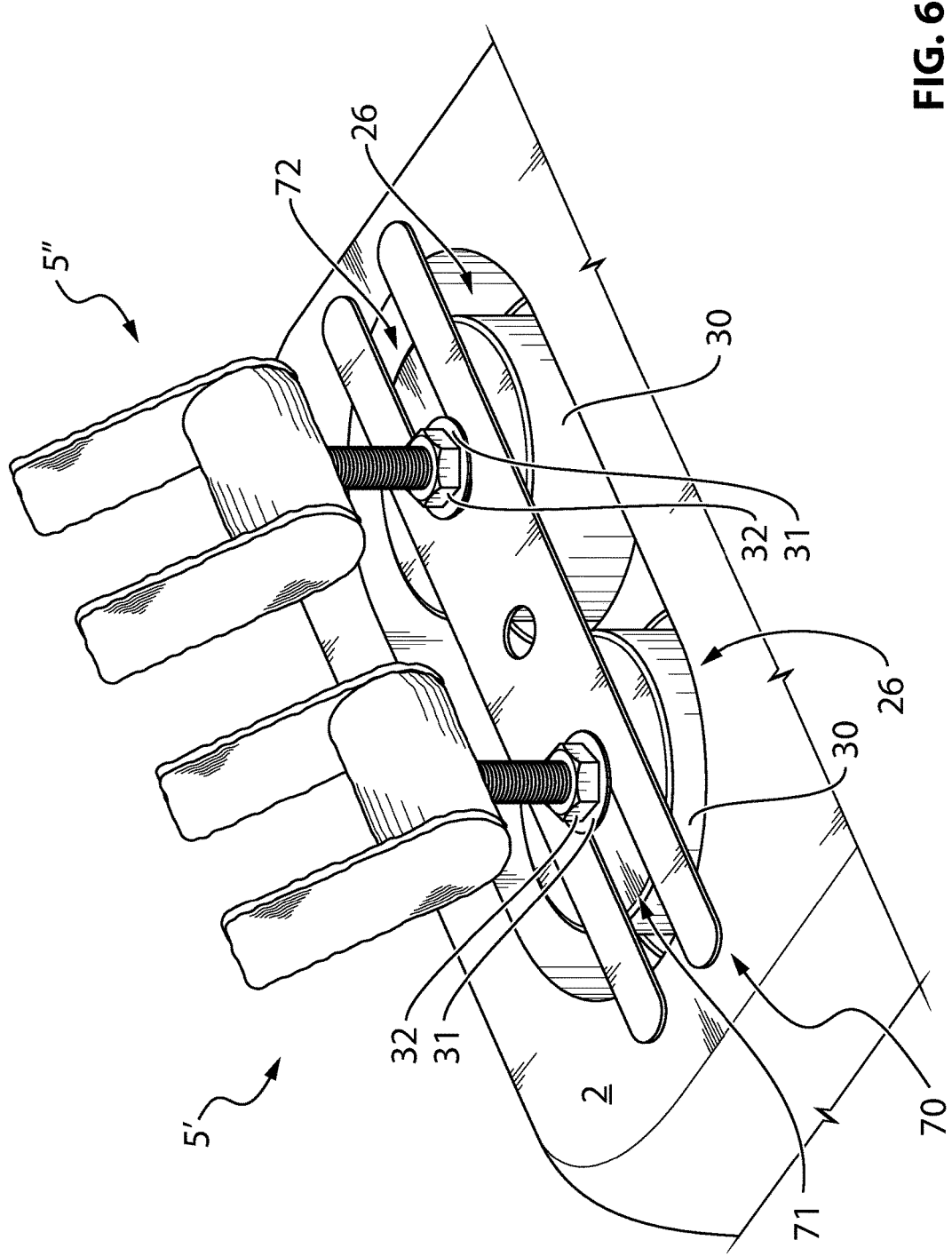
FIG. 6 is a side perspective view of a pair of gun holding devices held together by the crossbar illustrated in FIG. 5A, in accordance with an embodiment of the present disclosure.
Figure 7:
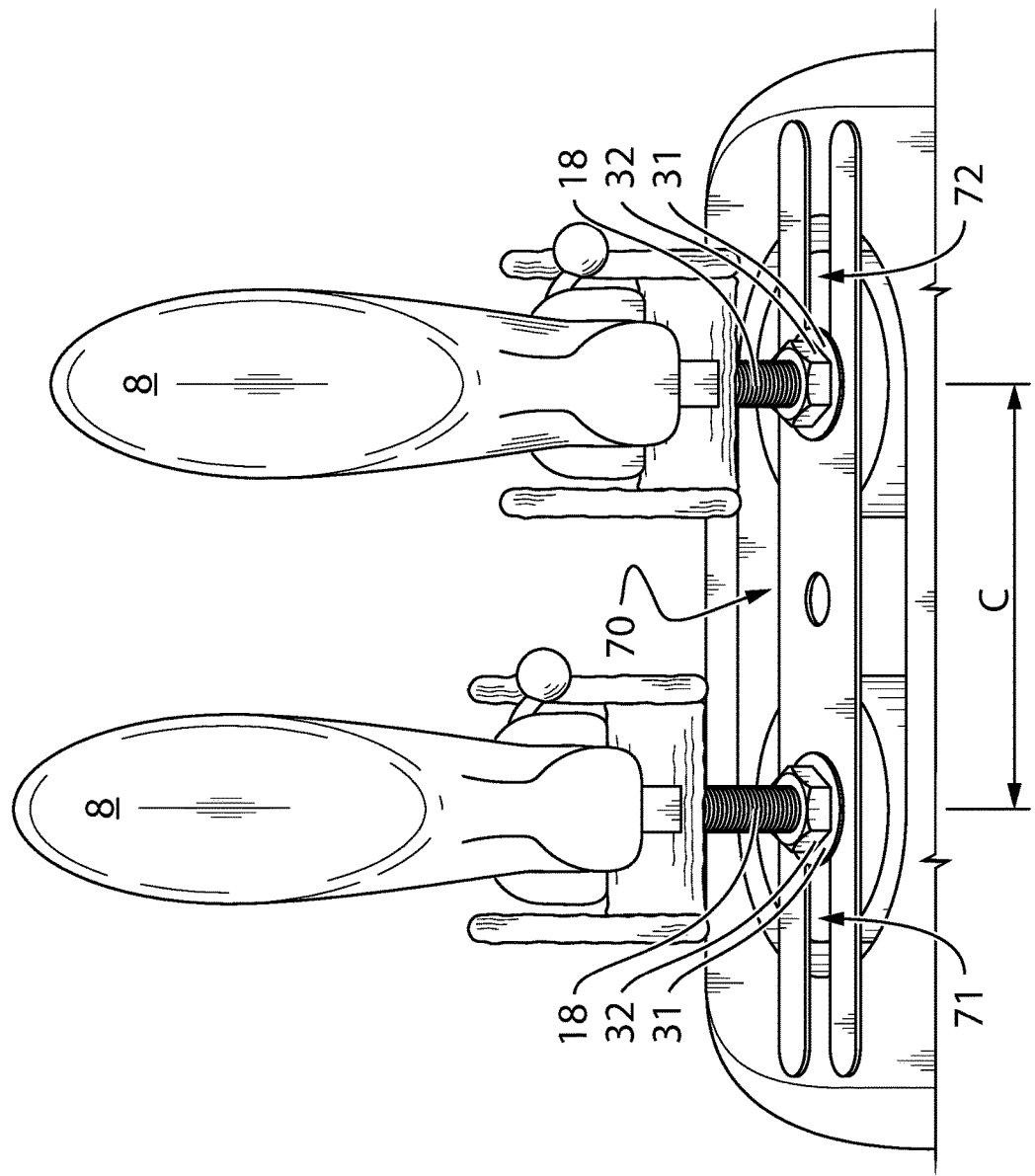
FIG. 7 is a rear perspective view of the pair of gun holding devices of FIG. 6, supporting a pair of guns therein.
Figure 11:
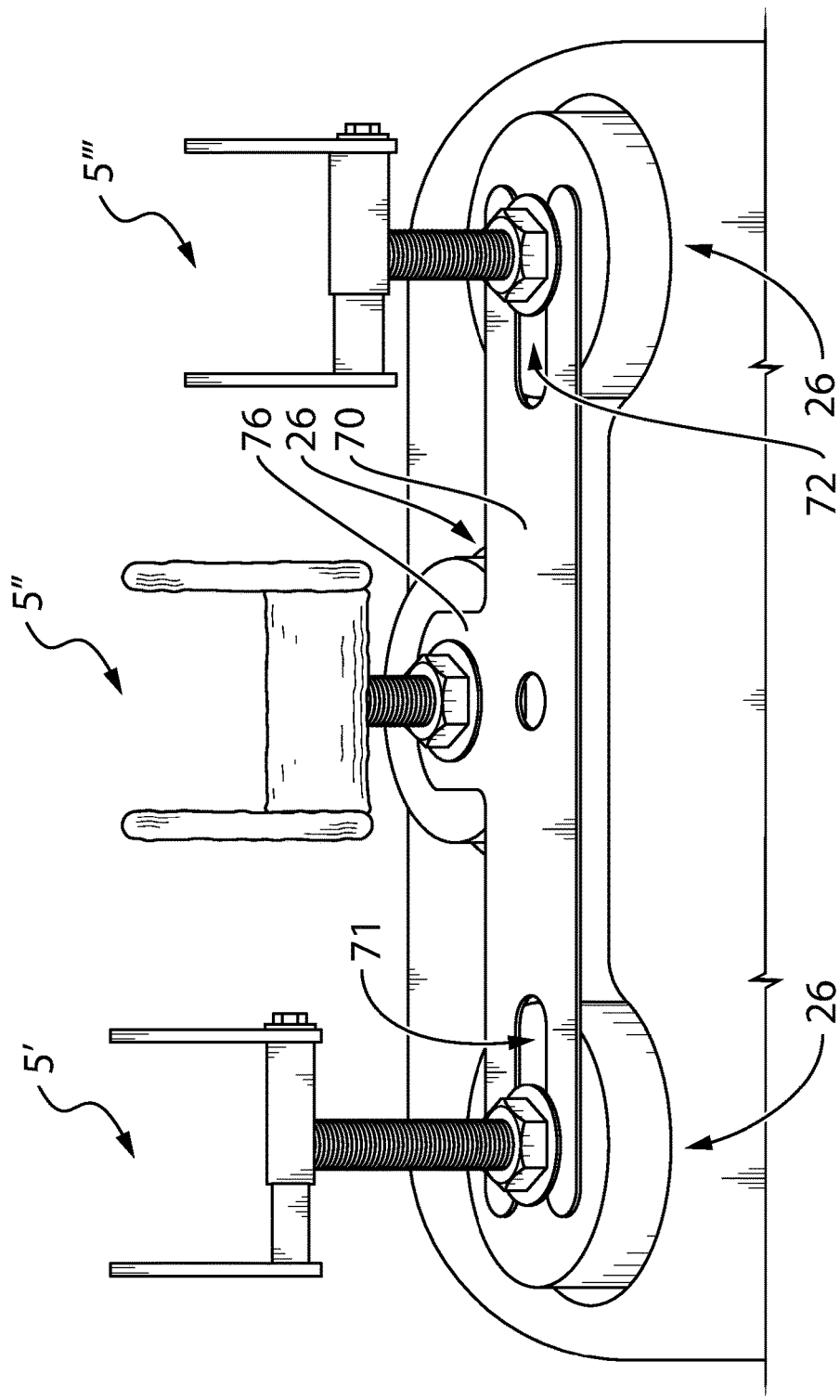
FIG. 11 is a top perspective view of three gun holding devices held together by the crossbar illustrated in FIG. 5B, in accordance with an embodiment of the present disclosure.

As may be seen in FIGS. 6, 7 and 11, one or more crossbars 70 may be used to physically connect two or more gun holding devices 5. For example, a first gun holding device 5' may be secured to a crossbar 70 by firstly loosening and moving the jam nut 32 towards the holder 10 of gun holding device 5', then sliding rod 18 through a first elongated opening 71 of crossbar 70. Next, the jam nut 32 of a second gun holding device 5" may be loosened and moved towards the holding portion 10 of the second gun holding device 5". The rod 18 of the second gun holding device 5" may then slide through the second elongated opening 72 of crossbar 70. Each of the gun holding devices 5', 5" may be then slid into the cup holders 26, 26. Finally, the jam nuts 32, 32 may be torqued towards the surface of the crossbar 70, so as to secure the washers 31, 31 between the jam nut 32 and the surface of the crossbar 70.

Alternatively, a cross bar 70' may be used to secure a third gun holding device 5''' by sliding the rod 18 of the third gun holding device 5''' through the obround opening 78, then locating each of the gun holders 5', 5" and 5''' in the respective cup holders 26, 26, 26, then torquing jam nuts 32 of each of the gun holders 5', 5", 5''' respectively so as to secure the jam nuts 32 and the washers 31 against the surface of the respective crossbars 70, 70'.

In the absence of a crossbar 70 connecting two or more gun holders 5, when a vehicle is travelling over particularly rough terrain, the motion of the vehicle may cause lateral or rotational movement of each of the gun holding devices 5 which movement may possibly cause the guns 7 held within gun holding devices 5 to clash together during travel, potentially causing damage to the guns 7. Thus, when one or more crossbars 70 are utilized to mechanically connect two or more gun holding devices 5, the crossbars 70 provide mechanical separation of the holding portions 10 of the each gun holding device 5, which helps to reduce or prevent lateral movement of the holding portion 10 of the plurality of gun holding devices 5 while a vehicle is travelling.

To account for varying distances C between cup holders 26 in various makes and models of vehicles, the width D of elongated openings 71, 72 and/or obround opening 78 and/or annular opening 74 are sized so as to receive the rod 18 and so as to enable securement of the washer 31 and the jam nut 32 against the surface of the crossbar 70, and therefore each of the rods 18', 18" of two different gun holding devices 5', 5" may be laterally translated along the elongated openings 71, 72 and/or obround opening 78 and/or annular opening 74, and the jam nuts 32', 32" and washers 31', 31" may be secured against the surface of the crossbar 70 at any lateral point along each of the respective elongated openings 71, 72 and/or obround opening 78 and/or annular opening 74 in order to allow the distance between the gun holding devices 5', 5" to be adjusted so as to be separated at a distance C between a given pair of cup holders 26 in a given vehicle.

What is claimed is:

1. A device for supporting a gun in a vehicle, comprising: first and second gun holding devices, each gun holding device comprising a base, each base comprising a body, an upper surface, a lower surface, and a holder mounted to the upper surface, wherein the holder is adapted to support a stock of a gun, and wherein the body of each base is adapted to releasably mount in a cup holder of the vehicle; and a crossbar comprising a body and at least a first and second attachment point for attachment to the first and second gun holding devices; whereby a first portion of the gun chosen from the group comprising a barrel and a stock is adjacent a support surface of the vehicle when a second portion of the gun is supported in a holder of the device.

2. The gun holding device of claim 1 further comprising a height adjuster comprising a lower end and an upper end, wherein the lower end is coupled to the upper surface of the base and the upper end is coupled to the holder, whereby a height of the holder relative to the upper surface of the base is selectable by actuating the height adjuster.

3. The gun holding device of claim 2, wherein the height adjuster further comprises a rod and a locking mechanism, wherein the base further comprises a bore journalled through the base extending from at least the upper surface of the base through the body, wherein the rod comprises an exposed length, whereby a lower end of the rod is journaled into the bore so as to selectively increase or decrease the exposed length of the rod and the height of the holder and whereby the locking mechanism may be actuated from an unlocked position to a locked position so as to releasably lock the selected height of the holder.

4. The gun holding device of claim 3, wherein the rod is substantially a cylinder and wherein at least a portion of a radially outward surface of the rod comprises threads and wherein at least a portion of an inner surface of the bore comprises complementary threads, whereby the height adjuster is actuated by rotating the rod so as to rotationally translate the threads relative to the complementary threads so as to selectively adjust the height of the holder in a substantially vertical direction relative to the upper surface of the base.

5. The gun holding device of claim 1, wherein the holder further comprises a foundation comprising a first end and a second end, a first arm coupled to the first end of the foundation, and a second arm coupled to the second end of the foundation, whereby the second portion of the gun is supported on the foundation between the first and second arms.

6. The gun holding device of claim 5, wherein the foundation further comprises a substantially planar surface for supporting the second portion of the gun, the planar surface comprising a lateral axis extending laterally across the foundation.

7. The gun holding device of claim 6, wherein the base further comprises a vertical, centroidal axis, substantially collinear with the rod and extending through the base, wherein the first and second arms each further comprise corresponding longitudinal first and second axes, wherein the lateral axis of the planar surface of the foundation is positioned at an angle substantially in the range between 120° and 135° to the centroidal axis, and wherein the first and second longitudinal axes are positioned at an angle substantially in the range between 30° and 45° to the centroidal axis.

8. The gun holding device of claim 7, wherein the lateral axis of the planar surface of the foundation is positioned at an angle substantially 130° to the centroidal axis.

9. The gun holding device of claim 5, wherein a lateral distance between the first and second arms is selectively adjustable.

10. The gun holding device of claim 5, wherein at least a portion of a surface of the foundation and at least a portion of a surface of each of the first and second arms are covered in a cushioning material whereby the second portion of the gun is at least partially in contact with the cushioning material when the second portion of the gun is supported in the holder.

11. The gun holding device of claim 1, wherein the base is substantially in the shape of a cylinder.

12. The gun holding device of claim 11, wherein a circumference of the base may be selectively expanded by securing a resilient cushion around the radially outward surface of the base.

13. The gun holding device claim 1, wherein the upper surface of the base further comprises at least one cavity adapted so as to slidably receive a bullet, whereby the bullet may be stored in the at least one cavity.

14. The gun holding device of claim 5, wherein the holder further comprises a selectively attachable retainer that couples to each of the first and second arms so as to retain the second portion of the gun in the holder.

15. A method for coupling at least two gun holding devices of claim 1, comprising:
   a) providing the device of claim 1, b) coupling a first gun holding device to the first attachment point of the crossbar, and c) coupling a second gun holding device to the second attachment point of the crossbar, so that a position of the first gun holding device remains fixed relative to a position of the second gun holding device.

16. The method of claim 15, further comprising providing a crossbar comprising at least three attachment points and coupling a third gun holding device to a third attachment point of the crossbar, whereby a position of the third gun holding device remains fixed relative to the positions of said first and second gun holding devices.

17. The method of claim 15, further comprising providing a second crossbar comprising a body and at least a first and second attachment point, coupling a first gun holding device to the first attachment point of the first crossbar, coupling a second gun holding device to the first attachment point of the second crossbar and coupling a third gun holding device to the second attachment points of each of the first and second crossbars.

* * * * *